United States Patent
Kim et al.

(10) Patent No.: US 10,767,735 B2
(45) Date of Patent: Sep. 8, 2020

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Jin Ho Kim, Suwon-si (KR); Jae Joon Lee, Anyang-si (KR); Jong Sool Park, Seongnam-si (KR); Kyeong Hun Lee, Seoul (KR); Jong Soo Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 70 days.

(21) Appl. No.: 16/201,849

(22) Filed: Nov. 27, 2018

(65) Prior Publication Data

US 2020/0003281 A1    Jan. 2, 2020

(30) Foreign Application Priority Data

Jun. 28, 2018  (KR) ........................ 10-2018-0074474

(51) Int. Cl.
    *F16H 3/62*           (2006.01)
(52) U.S. Cl.
    CPC ....... *F16H 3/62* (2013.01); *F16H 2200/0069* (2013.01); *F16H 2200/2015* (2013.01); *F16H 2200/2046* (2013.01)

(58) Field of Classification Search
    CPC ........................................................ F16H 3/62
    See application file for complete search history.

(56) References Cited

U.S. PATENT DOCUMENTS

| 10,495,189 | B2 * | 12/2019 | Kim ......................... F16H 3/66 |
| 2019/0107176 | A1 * | 4/2019 | Irving ...................... F16H 3/66 |
| 2019/0128383 | A1 * | 5/2019 | Kim ......................... F16H 3/66 |

FOREIGN PATENT DOCUMENTS

KR    10-2017-0108440 A    9/2017

* cited by examiner

*Primary Examiner* — Derek D Knight
(74) *Attorney, Agent, or Firm* — Morgan, Lewis & Bockius LLP

(57) ABSTRACT

A planetary gear train of an automatic transmission for a vehicle may include an input shaft to which power of an engine is transmitted, an output shaft outputting the power, a first planetary gear set including first, second, and third rotation elements, a second planetary gear set including fourth, fifth and sixth rotation elements, a third planetary gear set including seventh, eighth and ninth rotation elements, a fourth planetary gear set including tenth, eleventh and twelfth rotation elements, a fifth planetary gear set including thirteenth, fourteenth and fifteenth rotation elements, and nine shafts and six coupling elements, each of which is connected between the first to fifth planetary gear sets.

19 Claims, 2 Drawing Sheets

| gear position | coupling element | | | | | | gear ratio | step ratio |
|---|---|---|---|---|---|---|---|---|
| | CL1 | CL2 | CL3 | B1 | B2 | B3 | | |
| 1 gear | | O | | O | | O | 5.483 | – |
| 2 gear | | | O | O | | O | 3.491 | 1.571 |
| 3 gear | | | O | | O | O | 2.614 | 1.336 |
| 4 gear | | O | O | | | O | 1.865 | 1.402 |
| 5 gear | O | | O | | | O | 1.512 | 1.233 |
| 6 gear | O | O | | | | O | 1.246 | 1.213 |
| 7 gear | O | O | O | | | | 1.000 | 1.246 |
| 8 gear | O | O | | | O | | 0.861 | 1.161 |
| 9 gear | O | | O | | O | | 0.707 | 1.218 |
| 10 gear | O | | O | O | | | 0.597 | 1.184 |
| reverse gear | O | | | O | | O | −5.494 | – |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2018-0074474, filed on Jun. 28, 2018 in the Korean Intellectual Property Office, the entire contents of which is incorporated herein for all purposes by this reference.

BACKGROUND OF THE INVENTION

Field of the Invention

The present invention relates to a planetary gear train of an automatic transmission for a vehicle.

Description of Related Art

A transmission, which is designed to provide multiple speeds, is directed to enable an engine to be operated at a more efficient range over the entire traveling range of a vehicle to improve fuel efficiency and is directed to providing a driver with an appropriate transmission gear ratio at his or her request to improve driving characteristics.

Accordingly, to obtain a satisfactory effect from such a multi-speed transmission, it is necessary to increase a gear ratio span, which is the entire range of transmission gear ratio which may be provided by the transmission, and to ensure an appropriate step ratio, which is the difference in transmission gear ratio between adjacent gear positions. Furthermore, it is desirable for the step ratio to change as linearly as possible.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle, which provides a transmission mechanism of 10 forward drive gears and 1 reverse drive gear and which exhibits a wide gear ratio span, a step ratio of a predetermined level or higher and linearity of step ratios while reducing the torque that has to be withstood by components, ensuring efficient durability.

In accordance with various aspects of the present invention, the above and other objects may be accomplished by the provision of a planetary gear train of an automatic transmission for a vehicle, including an input shaft to which the power of an engine is transmitted, an output shaft outputting the power, a first planetary gear set including first, second, and third rotation elements, a second planetary gear set including fourth, fifth and sixth rotation elements, a third planetary gear set including seventh, eighth and ninth rotation elements, a fourth planetary gear set including tenth, eleventh and twelfth rotation elements, a fifth planetary gear set including thirteenth, fourteenth and fifteenth rotation elements, a first shaft connected to the first rotation element, the fifth rotation element and the input shaft, a second shaft connected to the fourteenth rotation element and the output shaft, a third shaft connected to the sixth rotation element, a fourth shaft connected to the eighth rotation element and the thirteen rotation element, a fifth shaft connected to the ninth rotation element, a sixth shaft connected to the eleventh rotation element and the fifteenth rotation element, a seventh shaft connected to the second rotation element, the fourth rotation element and the seventh rotation element, an eighth shaft connected to the third rotation element and the tenth rotation element, and a ninth shaft connected to the twelfth rotation element.

The planetary gear train may further include six coupling elements for selectively coupling one of the first to ninth shafts to another of the first to ninth shafts or to a transmission housing, and three of the six coupling elements may be controlled to be coupled to one another simultaneously to implement one of forward drive gear shiftings and a reverse drive gear shifting.

The six coupling elements may include three clutches for coupling two of the first to ninth shafts to each other, and three brakes for selectively coupling one of the first to ninth shafts which is not connected to the input shaft or the output shaft with the transmission housing.

The six coupling elements may include a first clutch disposed between the second shaft and the fifth shaft, a second clutch disposed between the first shaft and the fourth shaft, a third clutch disposed between the third shaft and the fourth shaft, a first brake disposed between the seventh shaft and the transmission housing, a second brake disposed between the eighth shaft and the transmission housing, and a third brake disposed between the ninth shaft and the transmission housing.

The six coupling elements may include a first clutch disposed between the fifth shaft and the sixth shaft, a second clutch disposed between the first shaft and the fourth shaft, a third clutch disposed between the third shaft and the fourth shaft, a first brake disposed between the seventh shaft and the transmission housing, a second brake disposed between the eighth shaft and the transmission housing, and a third brake disposed between the ninth shaft and the transmission housing.

The first, second, and third rotation elements may be a first sun gear, a first planet carrier and a first ring gear, respectively, the fourth, fifth and sixth rotation elements may be a second sun gear, a second planet carrier and a second ring gear, respectively, the seventh, eighth and ninth rotation elements may be a third sun gear, a third planet carrier and a third ring gear, respectively, the tenth, eleventh and twelfth rotation elements may be a fourth sun gear, a fourth planet carrier and a fourth ring gear, respectively, and the thirteenth, fourteenth and fifteenth rotation elements may be a fifth sun gear, a fifth planet carrier and a fifth ring gear, respectively.

The first to fifth planetary gear sets may be disposed in the order of the first planetary gear set, the second planetary gear set, the third planetary gear set, the fifth planetary gear set and the fourth planetary gear set in a direction toward one side from the other side thereof.

Furthermore, to accomplish the object, a planetary gear train of an automatic transmission for a vehicle according to an exemplary embodiment of the present invention may include an input shaft and an output shaft, which are concentrically disposed; a first planetary gear set, a second planetary gear set, a third planetary gear set, a fourth planetary gear set and a fifth planetary gear set, which are provided between the input shaft and the output shaft and each of which may include three rotation elements; and six coupling elements, which are configured to provide the rotation elements of the planetary gear sets with variable frictional force, wherein a first rotation element of the first planetary gear set is directly connected to the input shaft, a second rotation element thereof is directly connected to a first rotation element of the second planetary gear set and to a first rotation element of the third planetary gear set and is holdably secured to a transmission housing via of the coupling elements, and a third rotation element thereof is directly connected to a first rotation element of the fourth planetary gear set and is holdably secured to the transmission housing via another of the coupling elements, wherein a second rotation element of the second planetary gear set is directly connected to the input shaft and is releasably connected to a second rotation element of the third planetary gear set, and a third rotation element thereof is releasably connected to the second rotation element of the third planetary gear set, wherein the second rotation element of the third planetary gear set is directly connected to a first rotation element of the fifth planetary gear set, and a third rotation element thereof is releasably connected to a second rotation element of the fifth planetary gear set, wherein the second rotation element of the fifth planetary gear set is directly connected to the output shaft, and a third rotation element thereof is directly connected to a second rotation element of the fourth planetary gear set, and wherein a third rotation element of the fourth planetary gear set is holdably secured to the transmission housing via a further another of the coupling elements.

Each of the first planetary gear set to the fifth planetary gear set may include a single-pinion planetary gear set, and the first planetary gear set, the second planetary gear set, the third planetary gear set, the fifth planetary gear set and the fourth planetary gear set may be sequentially disposed in the present order in the axial direction of the input shaft.

The six coupling elements may include a first clutch, a second clutch, a third clutch, a first brake, a second brake and a third brake, wherein the second rotation element of the first planetary gear set is holdably secured to the transmission housing by the first brake, and the third rotation element thereof is holdably secured to the transmission housing by the second brake, wherein the second rotation element of the second planetary gear set is releasably connected to the second rotation element of the third planetary gear set via the second clutch, and the third rotation element thereof is releasably connected to the second rotation element of the third planetary gear set via the third clutch, and wherein the third rotation element of the third planetary gear set is releasably connected to the second rotation element of the fifth planetary gear set via the first clutch, and the third rotation element of the fourth gear set is holdably secured to the transmission housing by the third brake.

The first rotation element of the first planetary gear set may be a first sun gear, the second rotation element thereof may be a first planet carrier, and the third rotation element thereof may be a first ring gear, wherein the first rotation element of the second planetary gear set may be a second sun gear, the second rotation element thereof may be a second planet carrier, and the third rotation element thereof may be a second ring gear, wherein the first rotation element of the third planetary gear set may be a third sun gear, the second rotation element thereof may be a third planet carrier, and the third rotation element thereof may be a third ring gear, wherein the first rotation element of the fourth planetary gear set may be a fourth sun gear, the second rotation element thereof may be a fourth planet carrier, and the third rotation element thereof may be a fourth ring gear, and wherein the first rotation element of the fifth planetary gear set may be a fifth sun gear, the second rotation element thereof may be a fifth planet carrier, and the third rotation element thereof may be a fifth ring gear.

Furthermore, to accomplish the above object, a planetary gear train of an automatic transmission for a vehicle according to an exemplary embodiment of the present invention may include a first planetary gear set, a second planetary gear set, a third planetary gear set, a fourth planetary gear set and a fifth planetary gear set, each of which may include three rotation elements; six coupling elements, which are configured to provide variable frictional force; and nine shafts, which are connected to the rotation elements of the planetary gear sets, wherein a first shaft is directly connected to a first rotation element of the first planetary gear set, to a second rotation element of the second planetary gear set and to an input shaft, a second shaft is directly connected to a second rotation element of the fifth planetary gear set and an to output shaft, a third shaft is directly connected to a third rotation element of the second planetary gear set, a fourth shaft is directly connected to a third rotation element of the third planetary gear set and to a first rotation element of the fifth planetary gear set, a fifth shaft is directly connected to the third rotation element of the third planetary gear set, and a second shaft is directly connected to a third rotation element of the fifth planetary gear set and to a second rotation element of the fourth planetary gear set, wherein three remaining shafts are fixedly secured to a transmission housing.

The three shafts, which are fixedly secured to the transmission housing, may include a seventh shaft, an eighth shaft and a ninth shaft, wherein the seventh shaft is directly connected to a second rotation element of the first planetary gear set, to a first rotation element of the second planetary gear set and to a first rotation element of the third planetary gear set, the eighth shaft is directly connected to a third rotation element of the first planetary gear set and to a first rotation element of the fourth gear set, and the ninth shaft is directly connected to a third rotation element of the fourth planetary gear set.

Among the six coupling elements, a first clutch may be provided between the second shaft and the fifth shaft, a second clutch may be provided between the first shaft and the fourth shaft, a third clutch may be provided between the third shaft and the fourth shaft, a first brake may be provided between the seventh shaft and the transmission housing, a second brake may be provided between the eighth shaft and the transmission housing, and a third brake may be provided between the ninth shaft and the transmission housing.

Among the six coupling elements, a first clutch may be provided between the fifth shaft and the sixth shaft, a second clutch may be provided between the first shaft and the fourth shaft, a third clutch may be provided between the third shaft and the fourth shaft, a first brake may be provided between the seventh shaft and the transmission housing, a second brake may be provided between the eighth shaft and the transmission housing, and a third brake may be provided between the ninth shaft and the transmission housing.

The first planetary gear set to the fifth planetary gear set may be disposed in the order of the first planetary gear set, the second planetary gear set, the third planetary gear set, the fifth planetary gear set and the fourth planetary gear set in the axial direction of the input shaft and the output shaft.

The rotation elements of each of the first planetary gear set PG1 to the fifth planetary gear set PG5 may be disposed such that the first rotation element, the second rotation element and the third rotation element are sequentially disposed radially outwards from the rotational center.

The methods and apparatuses of the present invention have other features and advantages which will be apparent from or are set forth in more detail in the accompanying drawings, which are incorporated herein, and the following Detailed Description, which together serve to explain certain principles of the present invention.

Figures 1, 2:
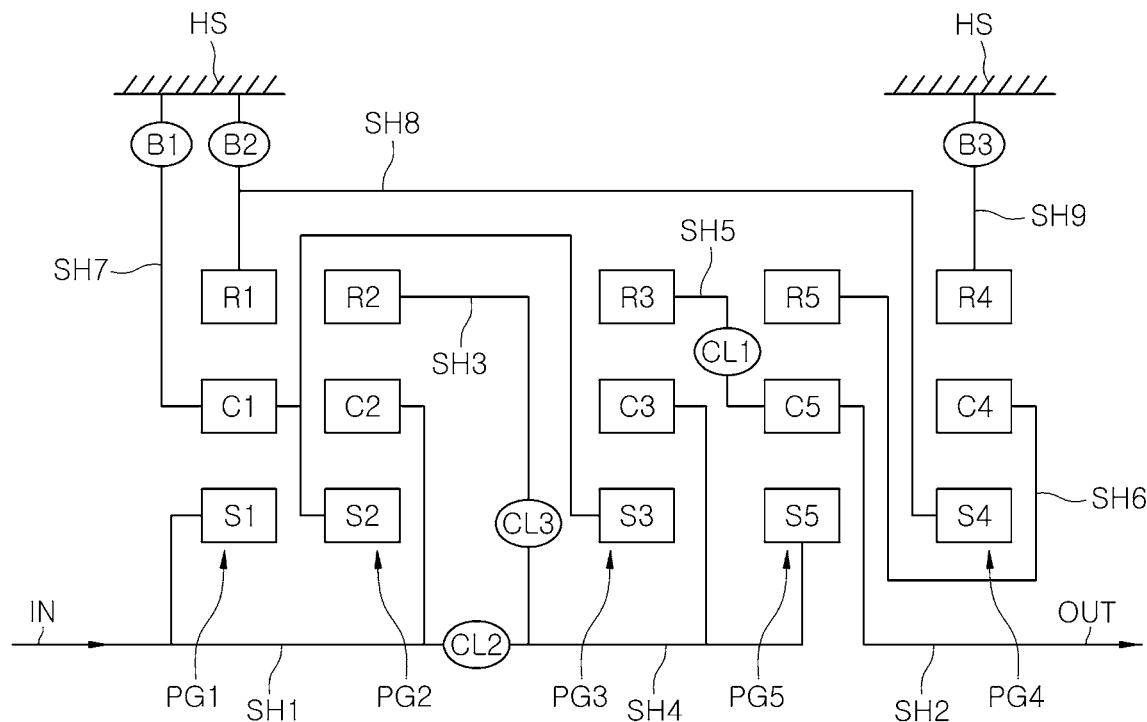
FIG. 1 is a view showing various exemplary embodiments of a planetary gear train of an automatic transmission for a vehicle according to an exemplary embodiment of the present invention.
FIG. 2 is an operation table of the planetary gear train shown in FIG. 1.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings.

Referring to FIG. 1, various exemplary embodiments of a planetary gear train for a vehicle according to an exemplary embodiment of the present invention includes an input shaft IN for receiving the power of an engine; an output shaft OUT for outputting power; a first planetary gear set PG1 including first, second, and third rotation elements; a second planetary gear set PG2 including fourth, fifth and sixth rotation elements; a third planetary gear set PG3 including seventh, eighth and ninth rotation elements; a fourth planetary gear set PG4 including tenth, eleventh and twelfth rotation elements; and a fifth planetary gear set PG5 including thirteenth, fourteenth and fifteenth rotation elements.

The planetary gear train includes a first shaft SH1, which is connected to the first rotation element, the fifth rotation element and the input shaft IN; a second shaft SH2, which is connected to the fourteenth rotation element and the output shaft OUT; a third shaft SH3, connected to the sixth rotation element; a fourth shaft SH4, which is connected to the eighth rotation element and the thirteenth rotation element; a fifth shaft SH5, connected to the ninth rotation element; a sixth shaft SH6, which is connected to the eleventh rotation element and the fifteenth rotation element; a seventh shaft SH7, which is connected to the second rotation element, the fourth rotation element and the seventh rotation element; an eighth shaft SH8, which is connected to the third rotation element and the tenth rotation element; and a ninth shaft SH9, connected to the twelfth rotation element.

The first, second, third, fourth and fifth planetary gear sets are disposed in the order of the first planetary gear set PG1, the second planetary gear set PG2, the third planetary gear set PG3, the fifth planetary gear set PG5 and the fourth planetary gear set PG4 in a direction toward one side from the other side thereof.

In other words, a power source such as an engine is connected to the first rotation element of the first planetary gear set PG1 and the fifth rotation element of the second planetary gear set PG2 through the input shaft IN and the first shaft SH1 to supply them with power. The supplied power is appropriately changed in speed by the arrangement of the present invention, in which the first planetary gear set PG1, the second planetary gear set PG2, the third planetary gear set PG3, the fifth planetary gear set PG5 and the fourth planetary gear set PG4 are sequentially disposed in the present order, and is then output to the output shaft OUT through the fourteenth rotation element of the fifth planetary gear set PG5 and the second shaft SH2.

Each of the first planetary gear set PG1, the second planetary gear set PG2, the third planetary gear set PG3, the fifth planetary gear set PG5 and the fourth planetary gear set PG4, which form the planetary gear train, includes a single-pinion planetary gear set including three rotation elements.

The planetary gear train is mounted in a transmission housing HS. A torque converter may be provided between the power source and the input shaft IN. The power output to the output shaft OUT may be provided to a drive wheel through a differential gear.

The planetary gear train includes six coupling elements, which are selectively configured to couple one shaft of the first to ninth shafts SH1 to SH9 to another shaft or to couple one shaft of the first to ninth shafts SH1 to SH9 to the transmission housing HS. The planetary gear train is constructed such that three coupling elements of the six coupling elements are controlled to be simultaneously coupled to one another to implement shifting to a specific gear among forward drive gear shiftings and a reverse drive gear shifting.

In a transmission which is provided with 1 to 10 forward drive gears and an R gear, which is a reverse drive gear, as illustrated in FIG. 2, shifting to a specific gear is implemented by coupling three of the six coupling elements to one another.

In a process of performing shifting to an adjacent gear among the plurality of gears, one of three coupling elements required for driving at the current gear is disengaged while one of three coupling elements required for driving at the target gear is engaged with the remaining two of the three coupling elements required for driving at the current gear, implementing a clutch-to-clutch shift.

The six coupling elements include three clutches, which are configured to engage two of the first to ninth shafts SH1 to SH9 with each other, and three brakes, which are configured to selectively connect the input shaft IN or a shaft, which is not connected to the output shaft OUT, to the transmission housing HS.

In the exemplary embodiment shown in FIG. 1, the six coupling elements include a first clutch CL1 provided between the seventh shaft SH7 and the transmission housing HS; a second clutch CL2 provided between the first shaft SH1 and the fourth shaft SH4; a third clutch CL3 provided between the third shaft SH3 and the fourth shaft SH4; a first brake B1 provided between the third shaft SH3 and the fourth shaft SH4; a second brake B2 provided between the eighth shaft SH8 and the transmission housing HS; and a third brake B3 provided between the ninth shaft SH9 and the transmission housing HS.

Figure 3:
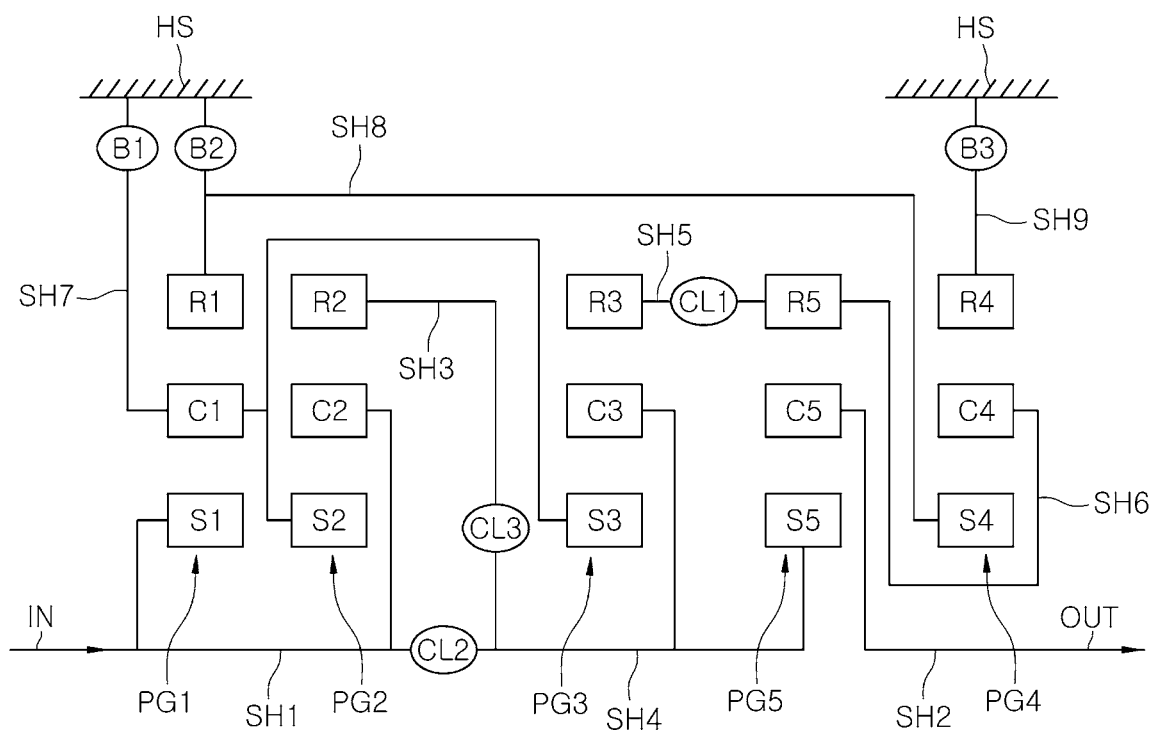
FIG. 3 is a view showing various exemplary embodiments of a planetary gear train of an automatic transmission for a vehicle according to an exemplary embodiment of the present invention.

Various exemplary embodiments shown in FIG. 3 is substantially identical to the various exemplary embodiments with the exception that, among the six coupling elements, only the first clutch CL1 is differently disposed. In the various exemplary embodiments of the present invention, the six coupling elements include a first clutch CL1 provided between the seventh shaft SH7 and the transmission housing HS; a second clutch CL2 provided between the first shaft SH1 and the fourth shaft SH4; a third clutch CL3 provided between the third shaft SH3 and the fourth shaft SH4; a first brake B1 provided between the third shaft SH3 and the fourth shaft SH4; a second brake B2 provided between the eighth shaft SH8 and the transmission housing HS; and a third brake B3 provided between the ninth shaft SH9 and the transmission housing HS.

In both the various exemplary embodiments of the present invention, the first, second, and third rotation elements include a first sun gear S1, a first planet carrier C1 and a first ring gear R1 of the first planetary gear set PG1, and the fourth, fifth and sixth rotation elements include a second sun gear S2, a second planet carrier C2 and a second ring gear R2 of the second planetary gear set PG2. The seventh, eighth and ninth rotation elements include a third sun gear S3, a third planet carrier C3 and a third ring gear R3 of the third planetary gear set PG3, and the tenth, eleventh and twelfth rotation elements include a fourth sun gear S4, a fourth planet carrier C4 and a fourth ring gear R4 of the fourth planetary gear set PG4. The thirteenth, fourteenth and fifteenth rotation elements include a fifth sun gear S5, a fifth planet carrier C5 and a fifth ring gear R5 of the fifth planetary gear set PG5.

The planetary gear train of an automatic transmission for a vehicle according to an exemplary embodiment of the present invention, which is constructed as described above, is constructed to implement various gears according to the operation table shown in FIG. 2.

In the state in which a forward 1 gear is engaged, the second clutch CL2, the first brake B1 and the third brake B3 are engaged with one another such that some of the power input to the input shaft IN and the first shaft SH1 is transmitted to the fourth sun gear S4 of the fourth planetary gear set PG4 via the eighth shaft SHB, because the seventh shaft SH7 is held by the first brake B1, and is then transmitted to the fifth ring gear R5 of the fifth planetary gear set PG5 via the fourth planet carrier C4 and the sixth shaft SH6, because the third brake B3 is engaged, and the remaining portion of the power is transmitted to the fifth sun gear S5 of the fifth planetary gear set PG5 via the second clutch CL2 and the fourth shaft SH4.

As a result, the torque is distributed both to the fifth sun gear S5 and to the fifth ring gear R5 of the fifth planetary gear set PG5, and the power for the first gear is output to the output shaft OUT via the fifth planet carrier C5 and the second shaft SH2. Consequently, since the torque is output to the two rotation elements in a parallel manner, the torque that has to be withstood by each of the respective rotation elements of the planetary gear set is reduced, improving the durability and efficiency of components forming the planetary gear train.

Shifting to 2 gear is implemented by a clutch-to-clutch shift in which the third clutch CL3 is engaged while the second clutch CL2 is disengaged. In the present gear, the power which is input to the second planet carrier C2 of the second planetary gear set PG2 via the input shaft IN is increased in speed by the second ring gear R2 and is then supplied to the fifth sun gear S5 of the fifth planetary gear set PG5 via the third shaft SH3, the third clutch CL3 and the fourth shaft SH4, with the result that the power for the 2 gear, which has a greater speed than the 1 gear, is output to the output shaft OUT.

Shifting to 3 gear is implemented by engaging the second brake B2 while releasing the first brake B1 in the state in which the 2 gear is engaged. Consequently, power input to the input shaft IN is transmitted to the second ring gear R2 of the second planetary gear set PG2, and is then transmitted to the fifth sun gear S5 of the fifth planetary gear set PG5 via the third shaft SH3, the third clutch CL3 and the fourth shaft SH4. in the instant state, since the fifth ring gear R5 of the fifth planetary gear set PG5 is held because both the second brake B2 and the third brake B3 are engaged, the power input to the fifth sun gear S5 is decreased in speed by the fifth planet carrier C5, and is then output to the output shaft OUT at a transmission gear ratio for the 3 gear.

Shifting to 4 gear is implemented by engaging the second clutch CL2 while releasing the second brake B2 in the state in which the 3 gear is active. Here, since both the second clutch CL2 and the third clutch CL3 are engaged, all of the rotation elements of the second planetary gear set PG2 are rotated together. Furthermore, since all of the rotation elements of the first planetary gear set PG1 are integrally rotated because the first shaft SH1 and the seventh shaft SH7 are integrally held, the eighth shaft SH8 is rotated at the same rotation speed as the input shaft IN, and the power is transmitted to the fourth sun gear S4 of the fourth planetary gear set PG4.

At the instant time, since the third brake B3 is engaged, the power supplied to the fourth sun gear S4 is decreased in speed by the fourth planet carrier C4, and is transmitted to the fifth ring gear R5 of the fifth planetary gear set PG5.

Part of the power which is supplied via the second clutch CL2 from the input shaft IN is supplied to the fifth sun gear S5 of the fifth planetary gear set PG5.

Consequently, all of the power that has been transmitted as described above is summed at the fifth planet carrier C5 of the fifth planetary gear set PG5, with the result that the driving force required for the 4 gear is output to the output shaft OUT.

Shifting to 5 gear is implemented by engaging the first clutch CL1 while releasing the second clutch CL2 used to engage the 4 gear.

The power input to the input shaft IN and the first shaft SH1 is transmitted to the fifth planetary gear set PG5 through a path defined by the third shaft SH3, the third clutch CL3, the fourth shaft SH4 and the fifth sun gear S5, a path defined by the seventh shaft SH7, the third planetary gear set PG3, the fifth shaft SH5, the first clutch CL1 and the fifth planet carrier C5 and a path defined by the eighth shaft SH8, the fourth planetary gear set PG4, the sixth shaft SH6 and the fifth ring gear R5, and is then output to the output shaft OUT via the second shaft SH2 as the power required for the forward 5 gear.

Shifting to 6 gear is implemented by engaging the second clutch CL2 in place of the third clutch CL3 used in the implementation of the 5 gear. The power input to the input shaft IN and the first shaft SH1 is transmitted to the fifth planetary gear set PG5 through a path defined by the second clutch CL2, the fourth shaft SH4 and the fifth sun gear S5, a path defined by the seventh shaft SH7, the third planetary gear set PG3, the fifth shaft SH5 and the first clutch CL1 and a path defined by the eighth shaft SH8, the fourth planetary gear set PG4, the sixth shaft SH6 and the fifth ring gear R5, and is then output to the output shaft OUT via the second shaft SH2 as the power required for the forward 6 gear.

Shifting to 7 gear is implemented by engaging the third clutch CL3 while releasing the third brake B3 used in the implementation of the 6 gear.

Here, since both the second clutch CL2 and the third clutch CL3 are held, all of the rotation elements of the first planetary gear set PG1 and the second planetary gear set PG2 are integrally rotated, and the fourth shaft SH4 connected to the third planet carrier C3 of the third planetary gear set PG3 and the seventh shaft SH7 connected to the third sun gear S3 are rotated at the same speed, with the result that all of the rotation elements of the third planetary gear set PG3 are rotated at the same speed as the input shaft IN. Consequently, the power from the third ring gear R3 of the third planetary gear set PG3 is directly output to the output shaft OUT via the first clutch CL1, the fifth planet carrier C5 and the second shaft SH2 at a transmission gear ratio of 1:1, implementing the shifting to the 7 gear.

Shifting to 8 gear is implemented by engaging the second brake B2 while disengaging the third clutch CL3 used in the implementation of the 7 gear. Power input to the input shaft IN and the first shaft SH1 is transmitted to the fifth planetary gear set PG5 through a path defined by the second clutch CL2, the fourth shaft SH4 and the fifth sun gear S5 and a path defined by the first planetary gear set PG1, the seventh shaft SH7, the third planetary gear set PG3, the fifth shaft SH5, the first clutch CL1 and the fifth planet carrier C5, and is then output to the output shaft OUT via the second shaft SH2 as the power required for the 8 gear.

Shifting to 9 gear is implemented by engaging the third clutch CL3 while disengaging the second clutch CL2 used in the implementation of the 8 gear. The power input to the input shaft IN and the first shaft SH1 is transmitted to the fifth planetary gear set PG5 through a path defined by the third shaft SH3, the third clutch CL3, the fourth shaft SH4 and the fifth sun gear S5 and a path defined by the seventh shaft SH7, the third planetary gear set PG3, the fifth shaft SH5 and the first clutch CL1, and is then output to the output shaft OUT via the second shaft SH2 as the power required for the 9 gear.

Shifting to 10 gear is implemented by engaging the first brake B1 while releasing the second brake B2 used in the implementation of the 9 gear. Power input to the input shaft IN and the first shaft SH1 is transmitted to the third shaft SH3, and is then supplied to the fifth sun gear S5 via the third clutch CL3 and the fourth shaft SH4. Subsequently, the power is increased in speed by the third planetary gear set PG3, and is then transmitted to the fifth planet carrier C5 via the fifth shaft SH5 and the first clutch CL1. The power is then output to the output shaft OUT via the second shaft SH2 as the power required for the 10 gear.

Shifting to the reverse drive gear is implemented by engaging the first clutch CL1, the first brake B1 and the third brake B3. Power input to the input shaft IN and the first shaft SH1 is reversed in rotation direction at the first planetary gear set PG1 due to engagement of the first brake B1, and is then transmitted to the fourth sun gear S4 of the fourth planetary gear set PG4 via the eighth shaft SH8. The power supplied to the fourth sun gear S4 is decreased in speed due to the third brake B3, and is then input to the fifth ring gear R5 via the fourth planet carrier C4 and the sixth shaft SH6. At the instant time, since the seventh shaft SH7 and the third sun gear S3 are held by the first brake B1 and the first clutch CL1 is engaged, the power input to the fifth ring gear R5 is further decreased in speed, and is output to the output shaft OUT via the fifth planet carrier C5 and the second shaft SH2 as the power required for reverse drive gear.

The present invention, which has been described above, may be represented as follows.

The exemplary embodiment shown in FIG. 1 includes the input shaft IN and the output shaft OUT, which are concentrically disposed; the first planetary gear set PG1, the second planetary gear set PG2, the third planetary gear set PG3, the fourth planetary gear set PG4 and the fifth planetary gear set PG5, which are provided between the input shaft IN and the output shaft OUT and each of which includes the three rotation elements; and the six coupling elements, which are configured to provide the rotation elements of the planetary gear sets with variable frictional force.

Here, the first rotation element of the first planetary gear set PG1 is directly connected to the input shaft IN, the second rotation element thereof is directly connected to the first rotation element of the second planetary gear set PG2 and to the first rotation element of the third planetary gear set PG3 and is holdably secured to the transmission housing via of the coupling elements, and the third rotation element thereof is directly connected to the first rotation element of the fourth planetary gear set PG4 and is holdably secured to the transmission housing via another of the coupling elements.

The second rotation element of the second planetary gear set PG2 is directly connected to the input shaft IN and is releasably connected to the second rotation element of the third planetary gear set PG3, and the third rotational thereof element is releasably connected to the second rotation element of the third planetary gear set PG3.

The second rotation element of the third planetary gear set PG3 is directly connected to the first rotation element of the fifth planetary gear set PG5, and the third rotation element thereof is releasably connected to the second rotation element of the fifth planetary gear set PG5.

The second rotation element of the fifth planetary gear set PG5 is directly connected to the output shaft OUT, and the third rotation element thereof is directly connected to the second rotation element of the fourth planetary gear set PG4.

The third rotation element of the fourth planetary gear set PG4 is holdably secured to the transmission housing HS via a further another of the coupling elements.

Each of the first planetary gear set PG1 to the fifth planetary gear set PG5 may include a single-pinion planetary gear set. The first planetary gear set PG1, the second planetary gear set PG2, the third planetary gear set PG3, the fifth planetary gear set PG5 and the fourth planetary gear set PG4 are sequentially disposed in the present order in the axial direction of the input shaft IN.

The six coupling elements include the first clutch CL1, the second clutch CL2, the third clutch CL3, the first brake B1, the second brake B2 and the third brake B3. The second rotation element of the first planetary gear set PG1 is holdably secured to the transmission housing HS by the first brake B1, and the third rotation element thereof is holdably secured to the transmission housing HS by the second brake B2. The second rotation element of the second planetary gear set PG2 is releasably connected to the second rotation element of the third planetary gear set PG3 via the second clutch CL2, and the third rotation element thereof is releasably connected to the second rotation element of the third planetary gear set PG3 via the third clutch CL3. The third rotation element of the third planetary gear set PG3 is releasably connected to the second rotation element of the fifth planetary gear set PG5 via the first clutch CL1, and the third rotation element of the fourth gear set PG4 is holdably secured to the transmission housing HS by the third brake B3.

The first rotation element of the first planetary gear set PG1 is the first sun gear S1, the second rotation element thereof is the first planet carrier C1, and the third rotation element thereof is the first ring gear R1. The first rotation element of the second planetary gear set PG2 is the second sun gear S2, the second rotation element thereof is the second planet carrier C2, and the third rotation element thereof is the second ring gear R2. The first rotation element of the third planetary gear set PG3 is the third sun gear S3, the second rotation element thereof is the third planet carrier C3, and the third rotation element thereof is the third ring gear R3. The first rotation element of the fourth planetary gear set PG4 is the fourth sun gear S4, the second rotation element thereof is the fourth planet carrier C4, and the third rotation element thereof is the fourth ring gear. The first rotation element of the fifth planetary gear set PG5 is the fifth sun gear S5, the second rotation element thereof is the fifth planet carrier C5, and the third rotation element thereof is the fifth ring gear R5.

Meanwhile, the present invention, which has been described above, may also be represented as follows.

The present invention includes the first planetary gear set PG1, the second planetary gear set PG2, the third planetary gear set PG3, the fourth planetary gear set PG4 and the fifth planetary gear set PG5, each of which includes three rotation elements; the six coupling elements, which are configured to provide variable frictional force; and the nine shafts, which are connected to the rotation elements of the planetary gear sets.

Here, the first shaft SH1 is directly connected to the first rotation element of the first planetary gear set PG1, to the second rotation element of the second planetary gear set PG2 and to the input shaft IN, and the second shaft SH2 is directly connected to the second rotation element of the fifth planetary gear set PG5 and to the output shaft OUT. The third shaft SH3 is directly connected to the third rotation element of the second planetary gear set PG2, and the fourth shaft SH4 is directly connected to the third rotation element of the third planetary gear set PG3 and to the first rotation element of the fifth planetary gear set PG5. The fifth shaft SH5 is directly connected to the third rotation element of the third planetary gear set PG3, and the sixth shaft SH6 is directly connected to the third rotation element of the fifth planetary gear set PG5 and to the second rotation element of the fourth planetary gear set PG4. The three remaining shafts are fixedly secured to the transmission housing HS.

The three shafts, which are fixedly secured to the transmission housing HS, includes the seventh shaft SH7, the eighth shaft SH8 and the ninth shaft SH9. The seventh shaft SH7 is directly connected to the second rotation element of the first planetary gear set PG1, to the first rotation element of the second planetary gear set PG2 and to the first rotation element of the third planetary gear set PG3, and the eighth shaft SH8 is directly connected to the third rotation element of the first planetary gear set PG1 and to the first rotation element of the fourth gear set PG4. The ninth shaft SH9 is directly connected to the third rotation element of the fourth planetary gear set PG4.

In the exemplary embodiment shown in FIG. 1, among the six coupling elements, the first clutch CL1 is provided between the second shaft SH2 and the fifth shaft SH5, the second clutch CL2 is provided between the first shaft SH1 and the fourth shaft SH4, and the third clutch CL3 is provided between the third shaft SH3 and the fourth shaft SH4. The first brake B1 is provided between the seventh shaft SH7 and the transmission housing HS, the second brake B2 is provided between the eighth shaft SH8 and the transmission housing HS, and the third brake B3 is provided between the ninth shaft SH9 and the transmission housing HS.

In the exemplary embodiment shown in FIG. 3, among the six coupling elements, the first clutch CL1 is provided between the fifth shaft SH5 and the sixth shaft SH6, the second clutch CL2 is provided between the first shaft SH1 and the fourth shaft SH4, and the third clutch CL3 is provided between the third shaft SH3 and the fourth shaft SH4. The first brake B1 is provided between the seventh shaft SH7 and the transmission housing HS, the second brake B2 is provided between the eighth shaft SH8 and the transmission housing HS, and the third brake B3 is provided between the ninth shaft SH9 and the transmission housing HS.

The first planetary gear set PG1 to the fifth planetary gear set PG5 are disposed in the order of the first planetary gear set PG1, the second planetary gear set PG2, the third planetary gear set PG3, the fifth planetary gear set PG5 and the fourth planetary gear set PG4 in the axial direction of the input shaft IN and the output shaft OUT.

The rotation elements of each of the first planetary gear set PG1 to the fifth planetary gear set PG5 are disposed such that the first rotation element, the second rotation element and the third rotation element are sequentially disposed radially outwards from the rotational center.

By the constructions included in the various exemplary embodiments of the present invention, the planetary gear train of an automatic transmission for a vehicle according to an exemplary embodiment of the present invention are directed to providing a shift transmission of 10 forward drive gears and 1 reverse drive gear and has a gear ratio span of 9.2. Accordingly, the planetary gear train enables an engine to be mainly operated in a more efficient range, improving fuel efficiency.

Furthermore, the planetary gear train according to an exemplary embodiment of the present invention exhibits a minimum step ratio of 1.161 or higher. Since the transition of change in step ratio with gear position exhibits linearity, which is analogous to an ideal transition of change in step ratio, it is possible to improve acceleration before and after shifting gears, smooth change in speed of an engine and the like, and thus to optimize the operating characteristics of a vehicle.

As is apparent from the above description, the planetary gear train of an automatic transmission for a vehicle according to an exemplary embodiment of the present invention are directed to providing a shift transmission of 10 forward drive gears and 1 reverse drive gear and has a gear ratio span of 9.2. Accordingly, the planetary gear train enables an engine to be mainly operated in a more efficient range, improving fuel efficiency.

Furthermore, the planetary gear train according to an exemplary embodiment of the present invention exhibits a minimum step ratio of 1.161 or higher. Since the transition of change in step ratio with gear position is linear, it is possible to improve acceleration before and after shifting, smooth change in speed of an engine and the like and thus to optimize the operating characteristics of a vehicle.

Furthermore, since the planetary gear train according to an exemplary embodiment of the present invention exhibits a wide gear ratio span, a step ratio of a predetermined level or higher and linearity of step ratio and since the torque that has to be withstood by components is reduced, it is possible to ensure efficient durability.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A planetary gear train apparatus of an automatic transmission for a vehicle, the planetary gear train apparatus comprising:
    an input shaft to which power of an engine is transmitted;
    an output shaft outputting the power;
    a first planetary gear set including a first rotation element, a second rotation element, and a third rotation element;
    a second planetary gear set including a fourth rotation element, a fifth rotation element and a sixth rotation element;
    a third planetary gear set including a seventh rotation element, an eighth rotation element and a ninth rotation element;
    a fourth planetary gear set including a tenth rotation element, an eleventh rotation element and a twelfth rotation element;
    a fifth planetary gear set including a thirteenth rotation element, a fourteenth rotation element and a fifteenth rotation element;
    a first shaft fixedly connected to the first rotation element, the fifth rotation element and the input shaft;
    a second shaft fixedly connected to the fourteenth rotation element and the output shaft;
    a third shaft fixedly connected to the sixth rotation element;
    a fourth shaft fixedly connected to the eighth rotation element and the thirteen rotation element;
    a fifth shaft fixedly connected to the ninth rotation element;
    a sixth shaft fixedly connected to the eleventh rotation element and the fifteenth rotation element;
    a seventh shaft fixedly connected to the second rotation element, the fourth rotation element and the seventh rotation element;
    an eighth shaft fixedly connected to the third rotation element and the tenth rotation element; and
    a ninth shaft fixedly connected to the twelfth rotation element.

2. The planetary gear train apparatus according to claim of claim 1, further including:
    six coupling elements for selectively coupling one of the first to ninth shafts to another of the first to ninth shafts or to a transmission housing,
    wherein three of the six coupling elements are controlled to be coupled to two shafts among the first to ninth shafts to one another, respectively, to implement one of forward drive gear shifting and a reverse drive gear shifting.

3. The planetary gear train apparatus according to claim of claim 2,
    wherein the three of the six coupling elements include:
        three clutches for coupling the two shafts of the first to ninth shafts to one another; and
    wherein remaining three of the six coupling elements include:
        three brakes for selectively coupling one of the first to ninth shafts which is not connected to the input shaft or the output shaft with the transmission housing.

4. The planetary gear train apparatus according to claim of claim 2,
    wherein the three of the six coupling elements include:
        a first clutch mounted between the second shaft and the fifth shaft;
        a second clutch mounted between the first shaft and the fourth shaft; and
        a third clutch mounted between the third shaft and the fourth shaft, and
    wherein remaining three of the six coupling elements include:
        a first brake mounted between the seventh shaft and the transmission housing;
        a second brake mounted between the eighth shaft and the transmission housing; and
        a third brake mounted between the ninth shaft and the transmission housing.

5. The planetary gear train apparatus according to claim of claim 2, wherein the six coupling elements include:
    wherein the three of the six coupling elements include:
    a first clutch mounted between the fifth shaft and the sixth shaft;
    a second clutch mounted between the first shaft and the fourth shaft; and
    a third clutch mounted between the third shaft and the fourth shaft, and
    wherein remaining three of the six coupling elements include:
    a first brake mounted between the seventh shaft and the transmission housing;
    a second brake mounted between the eighth shaft and the transmission housing; and
    a third brake mounted between the ninth shaft and the transmission housing.

6. The planetary gear train apparatus according to claim of claim 1,
    wherein the first rotation element, the second rotation element, and the third rotation element are a first sun gear, a first planet carrier and a first ring gear, respectively,
    wherein the fourth rotation element, the fifth rotation element and the sixth rotation element are a second sun gear, a second planet carrier and a second ring gear, respectively, wherein the seventh rotation element, the eighth rotation element and the ninth rotation element are a third sun gear, a third planet carrier and a third ring gear, respectively, wherein the tenth rotation element, the eleventh rotation element and the twelfth rotation element are a fourth sun gear, a fourth planet carrier and a fourth ring gear, respectively, and wherein the thirteenth rotation element, the fourteenth rotation element, and the fifteenth rotation element are a fifth sun gear, a fifth planet carrier and a fifth ring gear, respectively.

7. The planetary gear train apparatus according to claim of claim 1, wherein the first to fifth planetary gear sets are mounted in an order of the first planetary gear set, the second planetary gear set, the third planetary gear set, the fifth planetary gear set and the fourth planetary gear set in a direction toward a first side from a second side of the planetary gear train apparatus.

8. A planetary gear train apparatus of an automatic transmission for a vehicle, the planetary gear train apparatus comprising:

an input shaft and an output shaft, which are concentrically mounted;

a first planetary gear set, a second planetary gear set, a third planetary gear set, a fourth planetary gear set and a fifth planetary gear set, which are mounted between the input shaft and the output shaft and each of which includes three rotation elements; and six coupling elements, which are configured to provide the three rotation elements of the first to fifth planetary gear sets with variable frictional force, wherein a first rotation element among the three rotation elements of the first planetary gear set is fixedly connected to the input shaft, a second rotation element among the three rotation elements of the first planetary gear set is fixedly connected to a first rotation element among the three rotation elements of the second planetary gear set and to a first rotation element among the three rotation elements of the third planetary gear set and is selectively connectable to a transmission housing via one of the six coupling elements, and a third rotation element among the three rotation elements of the first planetary gear set is fixedly connected to a first rotation element among the three rotation elements of the fourth planetary gear set and is selectively connectable to the transmission housing via another of the six coupling elements, wherein a second rotation element among the three rotation elements of the second planetary gear set is fixedly connected to the input shaft and is selectively connectable to a second rotation element among the three rotation elements of the third planetary gear set, and a third rotation element among the three rotation elements of the second planetary gear set is selectively connectable to the second rotation element among the three rotation elements of the third planetary gear set, wherein the second rotation element among the three rotation elements of the third planetary gear set is fixedly connected to the first rotation element among the three rotation elements of the fifth planetary gear set, and a third rotation element among the three rotation elements of the third planetary gear set is selectively connectable to a second rotation element among the three rotation elements of the fifth planetary gear set, wherein the second rotation element among the three rotation elements of the fifth planetary gear set is fixedly connected to the output shaft, and a third rotation element among the three rotation elements of the fifth planetary gear set is fixedly connected to a second rotation element among the three rotation elements of the fourth planetary gear set, and wherein a third rotation element among the three rotation elements of the fourth planetary gear set is selectively connectable to the transmission housing via a further another of the six coupling elements.

9. The planetary gear train apparatus according to claim of claim 8, wherein each of the first planetary gear set to the fifth planetary gear set includes a single pinion planetary gear set, and the first planetary gear set, the second planetary gear set, the third planetary gear set, the fifth planetary gear set and the fourth planetary gear set are sequentially mounted in an order in an axial direction of the input shaft.

10. The planetary gear train apparatus according to claim of claim 8, wherein the six coupling elements include a first clutch, a second clutch, a third clutch, a first brake, a second brake and a third brake, wherein the one, the another, and the further another of the six coupling elements are the first brake, the second brake, and the third brake, respectively, wherein the second rotation element of the first planetary gear set is selectively connectable to the transmission housing by the first brake, and the third rotation element of the first planetary gear set is selectively connectable to the transmission housing by the second brake, wherein the second rotation element of the second planetary gear set is selectively connectable to the second rotation element of the third planetary gear set and the first rotation element of the fifth planetary gear set via the second clutch, and the third rotation element of the second planetary gear set is selectively connectable to the second rotation element of the third planetary gear set and the first rotation element of the fifth planetary gear set via the third clutch, and wherein the third rotation element of the third planetary gear set is selectively connectable to the second rotation element of the fifth planetary gear set via the first clutch, and the third rotation element of the fourth gear set is selectively connectable to the transmission housing by the third brake.

11. The planetary gear train apparatus according to claim of claim 10, wherein the first rotation element of the first planetary gear set is a first sun gear, the second rotation element of the first planetary gear set is a first planet carrier, and the third rotation element of the first planetary gear set is a first ring gear, wherein the first rotation element of the second planetary gear set is a second sun gear, the second rotation element of the second planetary gear set is a second planet carrier, and the third rotation element of the second planetary gear set is a second ring gear, wherein the first rotation element of the third planetary gear set is a third sun gear, the second rotation element of the third planetary gear set is a third planet carrier, and the third rotation element of the third planetary gear set is a third ring gear, wherein the first rotation element of the fourth planetary gear set is a fourth sun gear, the second rotation element of the fourth planetary gear set is a fourth planet carrier, and the third rotation element of the fourth planetary gear set is a fourth ring gear, and wherein the first rotation element of the fifth planetary gear set is a fifth sun gear, the second rotation element of the fifth planetary gear set is a fifth planet carrier, and the third rotation element of the fifth planetary gear set is a fifth ring gear.

12. The planetary gear train apparatus according to claim of claim 8, wherein the six coupling elements include a first clutch, a second clutch, a third clutch, a first brake, a second brake and a third brake, wherein the one, the another, and the further another of the six coupling elements are the first brake, the second brake, and the third brake, respectively, wherein the second rotation element of the first planetary gear set is selectively connectable to the transmission housing by the first brake, and the third rotation element of the first planetary gear set is selectively connectable to the transmission housing by the second brake, wherein the second rotation element of the second planetary gear set is selectively connectable to the second rotation element of the third planetary gear set and the first rotation element of the fifth planetary gear set via the second clutch, and the third rotation element of the second planetary gear set is selectively connectable to the second rotation element of the third planetary gear set and the first rotation element of the fifth planetary gear set via the third clutch, and wherein the third rotation element of the third planetary gear set is selectively connectable to the third rotation element of the fifth planetary gear set via the first clutch, and the third rotation element of the fourth gear set is selectively connectable to the transmission housing by the third brake.

13. The planetary gear train apparatus according to claim of claim 12, wherein the first rotation element of the first planetary gear set is a first sun gear, the second rotation element of the first planetary gear set is a first planet carrier, and the third rotation element of the first planetary gear set is a first ring gear, wherein the first rotation element of the second planetary gear set is a second sun gear, the second rotation element of the second planetary gear set is a second planet carrier, and the third rotation element of the second planetary gear set is a second ring gear, wherein the first rotation element of the third planetary gear set is a third sun gear, the second rotation element of the third planetary gear set is a third planet carrier, and the third rotation element of the third planetary gear set is a third ring gear, wherein the first rotation element of the fourth planetary gear set is a fourth sun gear, the second rotation element of the fourth planetary gear set is a fourth planet carrier, and the third rotation element of the fourth planetary gear set is a fourth ring gear, and wherein the first rotation element of the fifth planetary gear set is a fifth sun gear, the second rotation element of the fifth planetary gear set is a fifth planet carrier, and the third rotation element of the fifth planetary gear set is a fifth ring gear.

14. A planetary gear train apparatus of an automatic transmission for a vehicle, the planetary gear train apparatus comprising:

a first planetary gear set, a second planetary gear set, a third planetary gear set, a fourth planetary gear set and a fifth planetary gear set, each of which includes three rotation elements;

six coupling elements, which are configured to provide the three rotation elements of the first to fifth planetary gear sets with variable frictional force; and first to ninth shafts, which are connected to the three rotation elements of the first to fifth planetary gear sets, wherein the first shaft is fixedly connected to a first rotation element among the three rotation elements of the first planetary gear set, to a second rotation element among the three rotation elements of the second planetary gear set and to an input shaft, wherein the second shaft is fixedly connected to a second rotation element among the three rotation elements of the fifth planetary gear set and to an output shaft, wherein the third shaft is fixedly connected to a third rotation element among the three rotation elements of the second planetary gear set, wherein the fourth shaft is fixedly connected to a second rotation element among the three rotation elements of the third planetary gear set and to a first rotation element among the three rotation elements of the fifth planetary gear set, wherein the fifth shaft is fixedly connected to a third rotation element among the three rotation elements of the third planetary gear set, and wherein the sixth shaft is fixedly connected to a third rotation element among the three rotation elements of the fifth planetary gear set and to a second rotation element among the three rotation elements of the fourth planetary gear set, wherein remaining three shafts among the first to ninth shafts are selectively connectable to a transmission housing.

15. The planetary gear train apparatus according to claim of claim 14, wherein the remaining three shafts, which are selectively connected to the transmission housing, includes the seventh shaft, the eighth shaft and the ninth shaft, wherein the seventh shaft is fixedly connected to a second rotation element among the three rotation elements of the first planetary gear set, to the first rotation element of the second planetary gear set and to a first rotation element among the three rotation elements of the third planetary gear set, wherein the eighth shaft is fixedly connected to a third rotation element among the three rotation elements of the first planetary gear set and to a first rotation element among the three rotation elements of the fourth gear set, and wherein the ninth shaft is fixedly connected to a third rotation element among the three rotation elements of the fourth planetary gear set.

16. The planetary gear train apparatus according to claim of claim 15, wherein the six coupling elements include a first clutch, a second clutch, a third clutch, a first brake, a second brake, and a third brake, and wherein the first clutch is mounted between the second shaft and the fifth shaft, wherein the second clutch is mounted between the first shaft and the fourth shaft, wherein the third clutch is mounted between the third shaft and the fourth shaft,
wherein the first brake is mounted between the seventh shaft and the transmission housing,
wherein the second brake is mounted between the eighth shaft and the transmission housing, and
wherein the third brake is mounted between the ninth shaft and the transmission housing.

17. The planetary gear train apparatus according to claim of claim 15,
wherein the six coupling elements include a first clutch, a second clutch, a third clutch, a first brake, a second brake, and a third brake, and
wherein the first clutch is mounted between the fifth shaft and the sixth shaft,
wherein the second clutch is mounted between the first shaft and the fourth shaft,
wherein the third clutch is mounted between the third shaft and the fourth shaft,
wherein the first brake is mounted between the seventh shaft and the transmission housing,
wherein the second brake is mounted between the eighth shaft and the transmission housing, and
wherein the third brake is mounted between the ninth shaft and the transmission housing.

18. The planetary gear train apparatus according to claim of claim 15,
wherein the first planetary gear set to the fifth planetary gear set are mounted in an order of the first planetary gear set, the second planetary gear set, the third planetary gear set, the fifth planetary gear set and the fourth planetary gear set in an axial direction of the input shaft and the output shaft.

19. The planetary gear train apparatus according to claim of claim 15,
wherein the first to third rotation elements of each of the first planetary gear set to the fifth planetary gear set are mounted such that the first rotation element, the second rotation element and the third rotation element of each of the first planetary gear set to the fifth planetary gear set are sequentially mounted radially outwards from a rotational center of each of the first planetary gear set to the fifth planetary gear set.

* * * * *